United States Patent
Shibata

(10) Patent No.: US 10,277,822 B2
(45) Date of Patent: Apr. 30, 2019

(54) IMAGE PICKUP APPARATUS WITH IMAGE STABILIZING FUNCTION, AND CONTROL METHOD THEREFOR

(71) Applicant: CANON KABUSHIKI KAISHA, Tokyo (JP)

(72) Inventor: Nobuhiro Shibata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/480,581

(22) Filed: Apr. 6, 2017

(65) Prior Publication Data

US 2017/0295322 A1 Oct. 12, 2017

(30) Foreign Application Priority Data

Apr. 11, 2016 (JP) ................. 2016-078972

(51) Int. Cl.
*H04N 5/232* (2006.01)
*H04N 5/238* (2006.01)
*G03B 13/36* (2006.01)
*G03B 5/02* (2006.01)
*G03B 3/10* (2006.01)
(Continued)

(52) U.S. Cl.
CPC ........... *H04N 5/23287* (2013.01); *G02B 7/36* (2013.01); *G02B 27/646* (2013.01); *G03B 3/10* (2013.01); *G03B 5/02* (2013.01); *G03B 13/36* (2013.01); *H04N 5/238* (2013.01); *H04N 5/23212* (2013.01); *H04N 5/23245* (2013.01); *H04N 5/23254* (2013.01); *H04N 5/23296* (2013.01); *G03B 2205/0015* (2013.01)

(58) Field of Classification Search
CPC .............. H04N 5/23287; H04N 5/238; H04N 5/23296; H04N 5/23245; H04N 5/23212; H04N 5/23254; G02B 7/36; G02B 27/646
See application file for complete search history.

(56) References Cited

U.S. PATENT DOCUMENTS 6,009,279 A * 12/1999 Kai .................. G03B 5/00
396/55
2006/0165396 A1* 7/2006 Yamazaki .......... G02B 27/0068
396/55
(Continued)

FOREIGN PATENT DOCUMENTS

JP 2009-145852 A 7/2009

*Primary Examiner* — Shahbaz Nazrul
(74) *Attorney, Agent, or Firm* — Cowan, Liebowitz & Latman, P.C.

(57) ABSTRACT

An image forming apparatus which is able to shoot high-quality images while improving image stabilization performance. An optical device which corrects for image blurring is moved in a direction different from an optical axis. Focusing is controlled by calculating a shape of a contrast using AF evaluation values at respective positions of a focus lens, which moves in the direction of the optical axis, at predetermined intervals and using a position of the focus lens at which the contrast is at its peak as a position at which a bundle of rays comes to a focus on a light-incident plane of the image pickup device. During the focusing control, positions of the focus lens obtained when the AF evaluation values were obtained or the obtained AF evaluation values are corrected according to detected positions of the optical device in a direction perpendicular to the optical axis.

8 Claims, 13 Drawing Sheets

(51) Int. Cl.
    *G02B 7/36*          (2006.01)
    *G02B 27/64*       (2006.01)

(56) References Cited

U.S. PATENT DOCUMENTS

| | | | |
|---|---|---|---|
| 2011/0261251 A1* | 10/2011 | Okamoto | G02B 7/102 |
| | | | 348/345 |
| 2014/0071303 A1* | 3/2014 | Hasegawa | H04N 5/23287 |
| | | | 348/208.11 |
| 2017/0013199 A1* | 1/2017 | Kunugi | G02B 27/646 |
| 2017/0295321 A1* | 10/2017 | Fukai | G02B 7/09 |

* cited by examiner

IMAGE PICKUP APPARATUS WITH IMAGE STABILIZING FUNCTION, AND CONTROL METHOD THEREFOR

BACKGROUND OF THE INVENTION

Field of the Invention

The present invention relates to an image pickup apparatus such as a digital camera and a digital single-reflex camera, digital video cameras, or a mobile terminal having an image pickup function, and a control method therefor.

Description of the Related Art

In image pickup apparatuses such as digital cameras, due to increase in magnification, image burring caused by camera shake or the like tends to be noticeable on a telephoto side where magnification is high, and further performance improvement of an image stabilization apparatus is demanded. The image stabilization apparatus detects camera shake or the like caused by photographer's movement, moves an image stabilization optical system in a direction substantially perpendicular to an optical axis so as to cancel the camera shake or the like caused by photographer's movement.

In order to meet the demand for performance improvement of the image stabilization apparatus, the image stabilization optical system needs to be moved to a large extent in the direction perpendicular to the optical axis, and this means that the image stabilization optical system goes farther away from the optical axis.

On the other hand, due to increase in the resolution of recent image pickup apparatuses such as digital cameras, even a subject being slightly out of focus is easily noticeable, and hence more accurate focusing is required. Examples of methods for focusing on a subject include a triangulation method that attains focus by measuring a distance to a subject using an installed external distance measurement sensor. Another method for focusing on a subject is a contrast AF method that automatically adjusts a focus using an AF evaluation value extracted by filtering a specific frequency component of a luminance signal obtained from an image pickup apparatus.

Further, in order to reduce effects of camera shake on focusing accuracy, there has been proposed a technique that changes a weight assigned to a first in-focus position obtained by the triangulation method and a weight assigned to a second in-focus position obtained by the contrast AF method, thus obtaining a third in-focus position (see Japanese Laid-Open Patent Publication (Kokai) No. 2009-145852).

However, as described above, if the image stabilization optical system is moved far from the optical axis, peripheral illumination and a subject contrast at the center of an image is decreased, and this brings about degradation in optical performance.

According to the AF contrast method, before the image pickup device is exposed to light, scanning is performed to obtain contrast levels of a subject (mountain obtainment scanning) while a focus lens is being moved over a predetermined section, and during shooting, the focus lens is moved to a position at which contrast is at its peak.

As a result, a subject is brought into focus, but when the image pickup apparatus is wobbled due to, for example, camera shake caused by photographer's movement while the mountain obtainment scanning is performed, the image pickup apparatus detects the wobble and moves the image stabilization apparatus in such a direction as to cancel the wobble. At this time, when the image stabilization optical system moves far from a center of the optical axis, a shape of a mountain found by the mountain obtainment scanning differs from that of a mountain found in a case where the image stabilization optical system lies at the center of the optical axis.

Here, camera shake caused by photographer's movement always occurs, and hence subject contrast as well always changes. For this reason, when the focus lens is moved to a position where contrast scanned by the mountain obtainment scanning immediately before shooting lies at its peak, the focus lens may be off an in-focus position.

Moreover, although during exposure, the focus lens is fixedly held without being moved, the image pickup apparatus detects a wobble such as camera shake caused by photographer's movement or the like and moves the image stabilization optical system even during exposure as well, and therefore, an exposure is made at a position where subject contrast is low.

SUMMARY OF THE INVENTION

The present invention provides an image pickup apparatus and a control method therefor, which are capable of shooting high-quality images while improving image stabilization performance.

Accordingly, the present invention provides an image pickup apparatus that corrects for image blurring of a subject image formed on an image pickup device by moving an optical device, which is configured to correct for image blurring, in a direction different from a direction of an optical axis, comprising a focusing control unit configured to provide focusing control by using AF evaluation values at respective positions of a focus lens, which moves in the direction of the optical axis, at predetermined intervals, and a correction unit configured to, during the focusing control, correct positions of the focus lens obtained when the AF evaluation values were obtained or the obtained AF evaluation values according to positions of the optical device in a direction perpendicular to the optical axis, which were detected by a position detecting unit.

According to the present invention, high-quality images are shot while image stabilization performance is improved.

Further features of the present invention will become apparent from the following description of exemplary embodiments (with reference to the attached drawings).

DESCRIPTION OF THE EMBODIMENTS

Hereafter, an exemplary embodiment of the present invention will be described with reference to the drawings.

Figure 1:
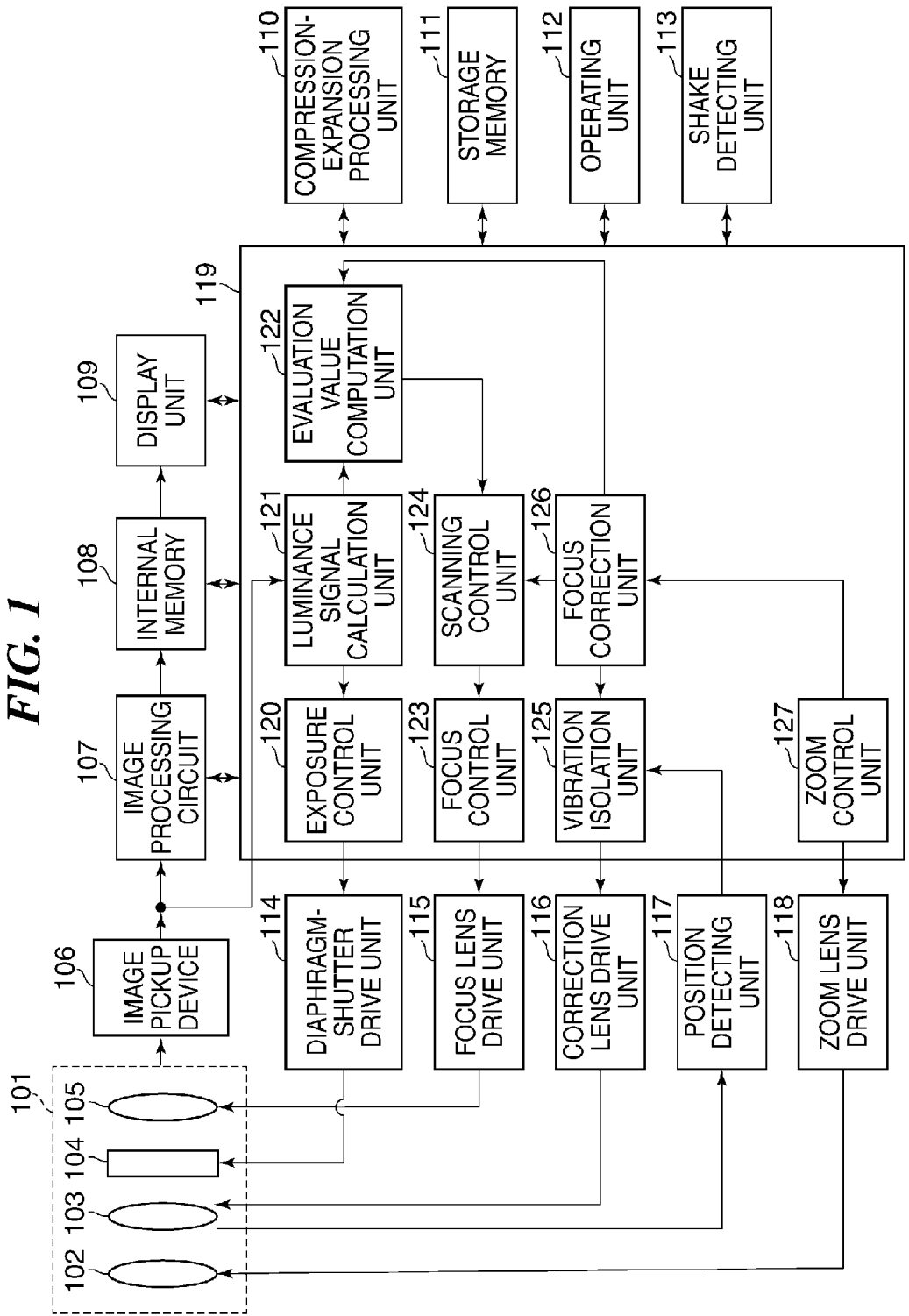
FIG. 1 is a block diagram schematically showing an exemplary system arrangement of a digital camera which is an exemplary embodiment of an image pickup apparatus according to the present invention.

FIG. 1 is a block diagram schematically showing an exemplary system arrangement of a digital camera which is an exemplary embodiment of an image pickup apparatus according to the present invention.

As shown in FIG. 1, the digital camera (hereafter referred to as the camera) according to the present embodiment has a shooting optical system of a lens barrel 101, which is comprised of a zoom lens 102, an image stabilization lens 103, a diaphragm/shutter 104, and a focus lens 105. The lens barrel 101 is of a zoom type which is able to change shooting magnifications by moving between a collapsed position and a shooting position in a direction of an optical axis.

A subject image that has passed through the shooting optical system of the lens barrel 101 forms an image on an image pickup device 106, which is comprised of a CCD sensor, a CMOS sensor, or the like, and is photoelectrically converted into an image signal. An image processing circuit 107 subjects the image signal, which is output from the image pickup device 106, to a pixel interpolation process, a color conversion process, and so forth, and outputs the image signal as image data to an internal memory 108. A display unit 109 is comprised of an LCD or the like and displays shooting information as well as image data obtained by shooting and stored in the internal memory 108.

A compression-expansion processing unit 110 compresses and expands image data, which is stored in the internal memory 108, according to image formats. A storage memory 111 stores a variety of data such as parameters. An operating unit 112 is a user interface on which a variety of menus are chosen and modes are selected. A shake detecting unit 113 detects a shake caused by, for example, wobbling of the camera.

A diaphragm-shutter drive unit 114 drives the diaphragm/shutter 104, a focus lens drive unit 115 drives the focus lens 105, a correction lens drive unit 116 drives the image stabilization lens 103, and a zoom lens drive unit 118 drives the zoom lens 102. A position detecting unit 117 obtains a current position of the image stabilization lens 103.

A system control unit 119, which is comprised of a CPU or the like, expands a variety of control programs stored in the internal memory 108 such as programs for use in AE control, AF control, vibration isolation control, zoom control, and so forth into the storage memory 111 and executes them.

The system control unit 119 has a luminance signal calculation unit 121, an exposure control unit 120, an evaluation value computation unit 122, a focus control unit 123, a scanning control unit 124, a vibration isolation control unit 125, a focus correction unit 126, and a zoom control unit 127.

The luminance signal calculation unit 121 calculates an image signal, which is output from the image pickup device 106, as a luminance of a subject. The exposure control unit 120 calculates exposure control values (an aperture value and a shutter speed) based on information on the luminance of the subject calculated by the luminance signal calculation unit 121, and outputs a result of the calculation to the diaphragm-shutter drive unit 114. As a result, automatic exposure (AE) control is performed by the diaphragm-shutter drive unit 114.

The evaluation value computation unit 122 extracts a specific frequency component from the luminance signal calculated by the luminance signal calculation unit 121 and then performs a computation using the specific frequency component as an AF evaluation value. The focus control unit 123 controls a direction in which and an amount by which the focus lens 105 is driven.

The scanning control unit 124 instructs the focus control unit 123 to drive the focus lens 105 over a predetermined range and also calculates a shape of a contrast by referring to AF evaluation values which are results of computation performed by the evaluation value computation unit 122 at predetermined positions of the focus lens 105. Then, automatic focusing control (AF control) is provided using a position of the focus lens 105 at which the contrast is at its peak as a position at which a bundle of rays comes to a focus on a light-incident plane of the image pickup device 106.

The vibration isolation control unit 125 calculates a direction in which and an amount by which the image stabilization lens 103 is moved so as to cancel blurring based on information detected by the shake detecting unit 113. The focus correction unit 126 corrects a position of the focus lens 105 in the direction of the optical axis or an AF evaluation value based on a position of the image stabilization lens 103. The zoom control unit 127 controls a position of the zoom lens 102 in the direction of the optical axis via the zoom lens drive unit 118 in accordance with a zooming instruction issued through the operating unit 112.

Figure 2:
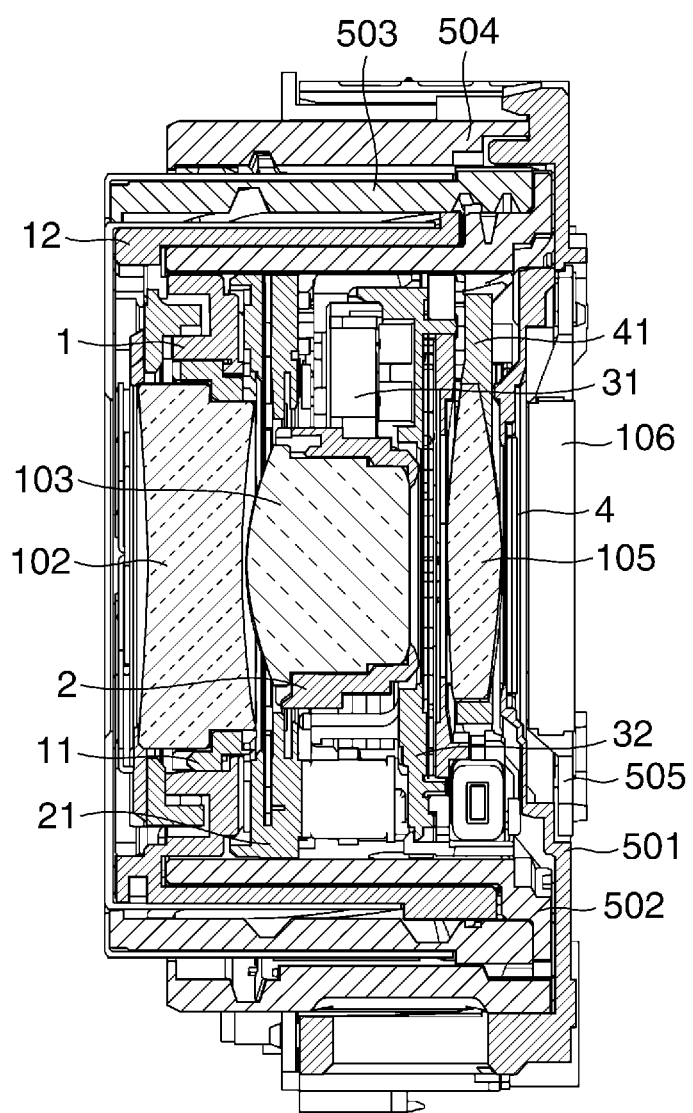
FIG. 2 is a cross-sectional view showing a lens barrel at a collapsed position.
Figure 3:
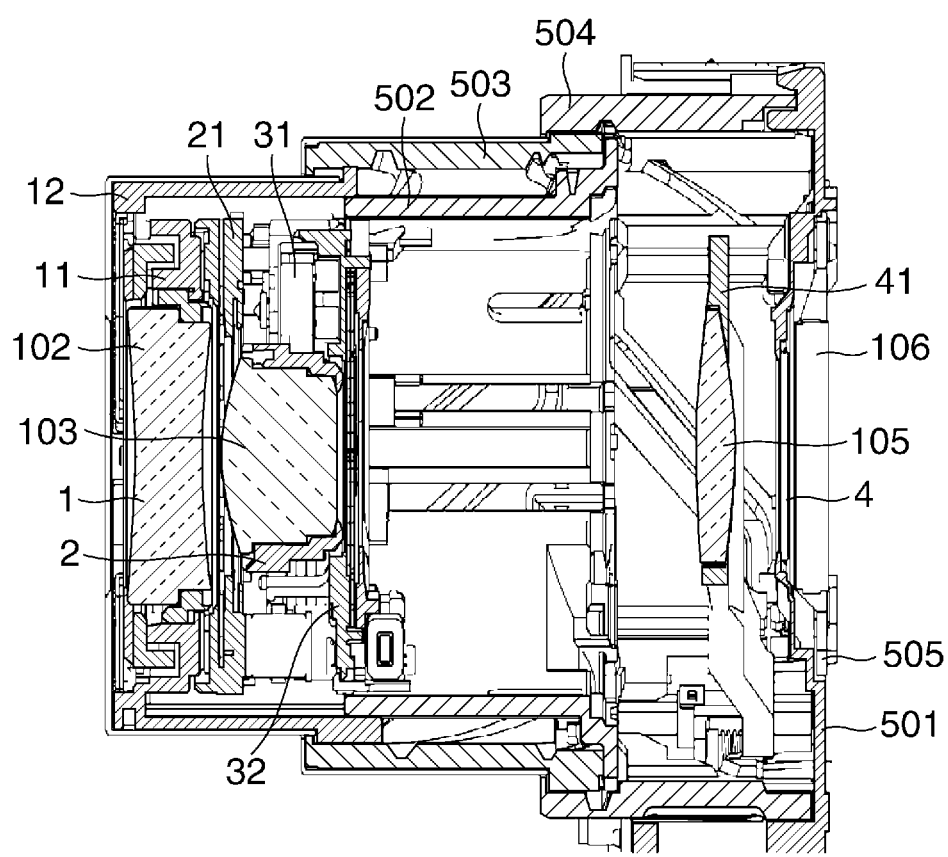
FIG. 3 is a cross-sectional view showing the lens barrel at a shooting position.
Figure 4:
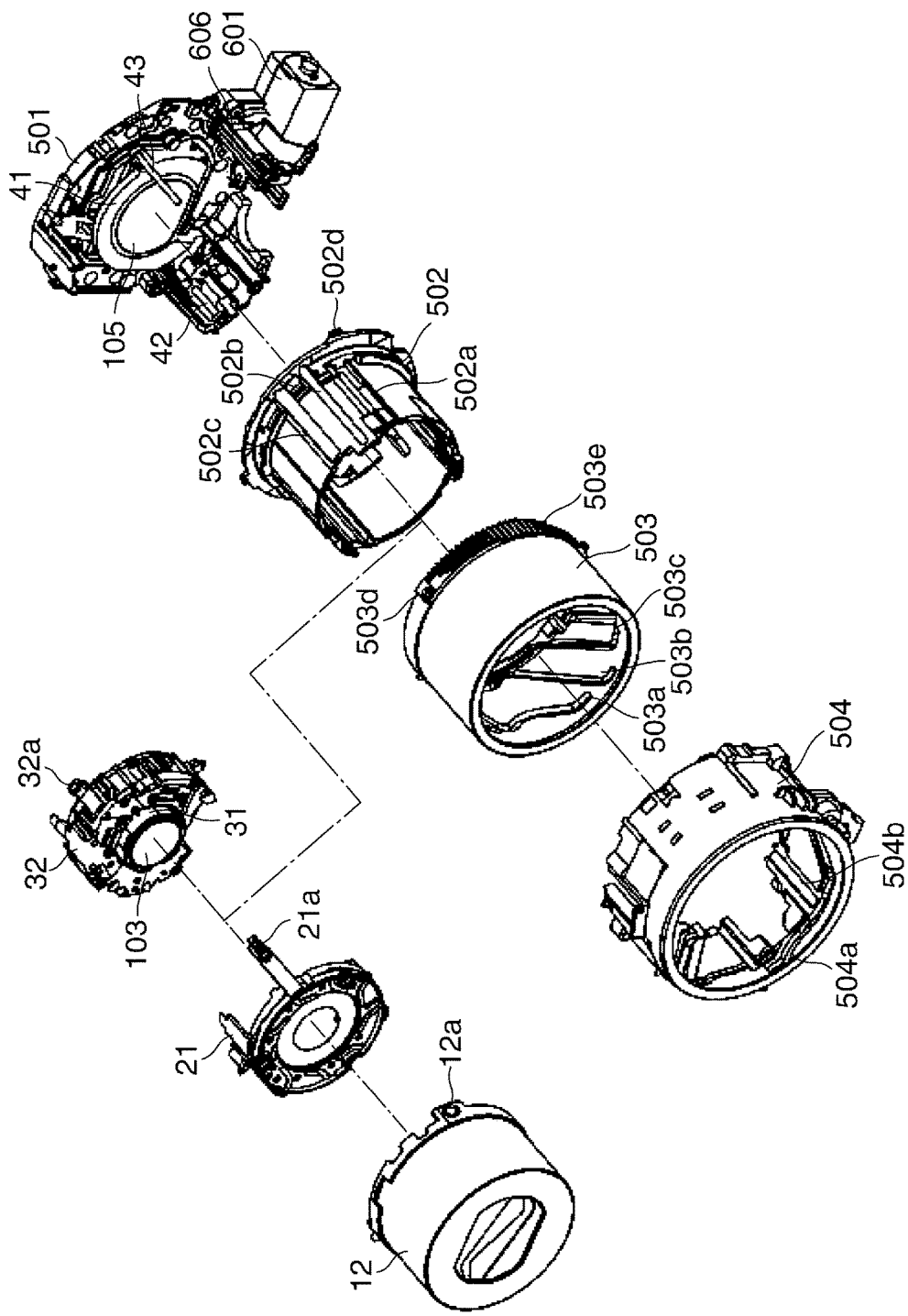
FIG. 4 is an exploded perspective view showing the lens barrel.
Figure 5:
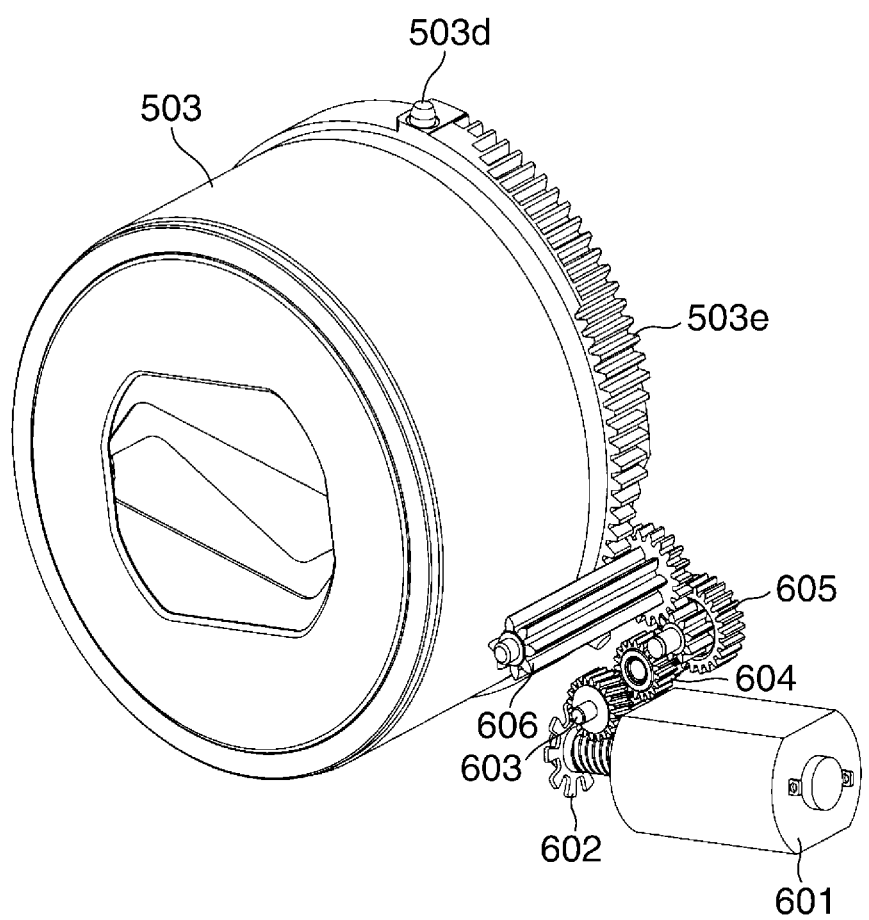
FIG. 5 is a perspective view useful in explaining a zoom lens drive unit.

Referring next to FIGS. 2 to 5, a description will be given of a construction of the lens barrel 101. FIG. 2 is a cross-sectional view showing the lens barrel 101 at the collapsed position. FIG. 3 is a cross-sectional view showing the lens barrel 101 in the shooting position. FIG. 4 is an exploded perspective view showing the lens barrel 101. FIG. 5 is a perspective view useful in explaining the zoom lens drive unit 118.

As shown in FIGS. 2 to 4, the lens barrel 101 has a group-1 unit 1, a diaphragm unit 21, a group-2 unit 2, a group-3 lens holding frame 41, and the image pickup device 106.

The group-1 unit 1 has a group-1 lens holding frame 11 holding the zoom lens 102, which is a first lens group, and a group-1 ground plate 12 holding the group-1 lens holding frame 11 and having a lens barrier that protects the zoom lens 102.

The group-2 unit 2 has a group-2 lens holding frame 31 holding the image stabilization lens 103 (herein after referred to as the correction lens 103), which is a second lens group, and a group-2 ground plate 32 having a shutter member, not shown. The shutter member and the diaphragm unit 21 constitute the diaphragm/shutter 104 in FIG. 1. The group-3 lens holding frame 41 holds the focus lens 105 which is a third lens group. The correction lens 103 corresponds to an exemplary optical device of the present invention.

The group-1 unit 1, the diaphragm unit 21, and the group-2 unit 2 are lens groups of a variable power type. The group-2 unit 2 has an image stabilization mechanism, and during shooting, the group-2 lens holding frame 31 holding the correction lens 103 moves in a direction substantially perpendicular to the optical axis, correcting for image blurring caused by, for example, camera shake during shooting.

The image pickup device 106 is supported on a sensor holder 501 via a sensor plate 505, and on a front side of the image pickup device 106, an optical filter 4 is provided in a state of being sandwiched between the sensor holder 501 and sensor rubber, not shown.

As shown in FIGS. 4 and 5, the sensor holder 501 has a zoom motor 601 and a gear train 603 to 606 which constitute the zoom lens drive unit 118 in FIG. 1. A gear unit 602 is attached to an output shaft of the zoom motor 601.

Driving the zoom motor 601 causes the gear unit 602 to rotate, and the rotation of the gear unit 602 is transmitted to a gear unit 503e of a movable cam ring 503 via the gear train 603 to 606, causing the movable cam ring 503 to rotate and enabling the lens barrel 101 to move in the direction of the optical axis. It should be noted that gear units of the gear train 603 to 605 are each comprised of a stepped gear which coaxially has a large-diameter gear unit and a small-diameter gear unit differing in the number of gear teeth, and the gear unit 606 of the gear train 603 to 606 as well is also comprised of a stepped gear which coaxially has a large-diameter gear unit and a small-diameter gear unit that extends in the direction of the optical axis.

As shown in FIG. 4, three types of cam grooves 503a, 503b, and 503c with different paths are formed in an inner peripheral portion of the movable cam ring 503. Follower pins 12a, 21a, and 32a, which are formed in outer peripheral portions of the group-1 ground plate 12, the diaphragm unit 21, and the group-2 ground plate 32, respectively, follow the cam grooves 503a, 503b, and 503c, respectively, of the movable cam ring 503.

Also, as shown in FIGS. 2 and 3, a straight-ahead movement guide cylinder 502 which restricts rotation of lens groups moving in the direction of the optical axis is provided on an inner peripheral side of the movable cam ring 503. The straight-ahead movement guide cylinder 502 and the movable cam ring 503 are bayonet-joined together and move in the direction of the optical axis substantially integrally with each other, and the movable cam ring 503 is rotatable relatively to the straight-ahead movement guide cylinder 502.

As shown in FIG. 4, the straight-ahead movement guide cylinder 502 has long grooves 502a, 502b, and 502c extending in the direction of the optical axis. The group-1 ground plate 12, the diaphragm unit 21, and the group-2 ground plate 32 moves straight in the direction of the optical axis while being inhibited from rotating by the long grooves 502a, 502b, and 502c of the straight-ahead movement guide cylinder 502.

A fixed cam ring 504 is provided on an outer peripheral side of the straight-ahead movement guide cylinder 502. As shown in FIGS. 2 to 4, the fixed cam ring 504 is fixedly placed by fastening it to the sensor holder 501 via a screw or the like. A cam groove 504a and a straight-ahead movement guide groove 504b, which extends in the direction of the optical axis, are formed in an inner peripheral portion of the fixed cam ring 504. As shown in FIG. 4, a follower pin 503d formed in an outer peripheral portion of the movable cam ring 503 is engaged with and follows the cam groove 504a, and a straight-ahead movement restricting portion 502d of the straight-ahead movement guide cylinder 502 is engaged with the guide groove 504b slidably in the direction of the optical axis.

As described earlier, in response to the zoom motor 601 starting to operate and causing the movable cam ring 503 to rotate, the movable cam ring 503 is engaged with the cam groove 504a formed in the inner peripheral portion of the fixed cam ring 504 and moves in the direction of the optical axis while rotating by following the cam groove 504a. A gear portion 503e of the movable cam ring 503 is engaged with the small-diameter gear portion of the gear unit 606 of the gear train 603 to 606, which extends in the direction of the optical axis, and the large-diameter gear portion of the gear unit 606 is positioned on an image plane side (on the image pickup device 106 side) of the small-diameter gear portion in the direction of the optical axis and engaged with the gear unit 605. To follow movement of the movable cam ring 503 in the direction of the optical axis, the small-diameter gear portion of the gear unit 606 extends in the direction of the optical axis in accordance with an amount by which the movable cam ring 503 extends.

The straight-ahead movement guide cylinder 502 moves in the direction of the optical axis integrally with the movable cam ring 503 while rotation of the straight-ahead movement guide cylinder 502 is inhibited by the straight-ahead movement guide portion 502d of the straight-ahead movement guide cylinder 502 slidably fitted in the straight-ahead movement guide groove 504b of the fixed cam ring 504. Thus, the straight-ahead movement guide cylinder 502 only moves straight.

As described above, rotation of the movable cam ring 503 causes the group-1 unit 1, the diaphragm unit 21, and the group-2 unit 2, which follow the movable cam ring 503, to move straight in the direction of the optical axis while being inhibited from rotating.

Figure 6A:
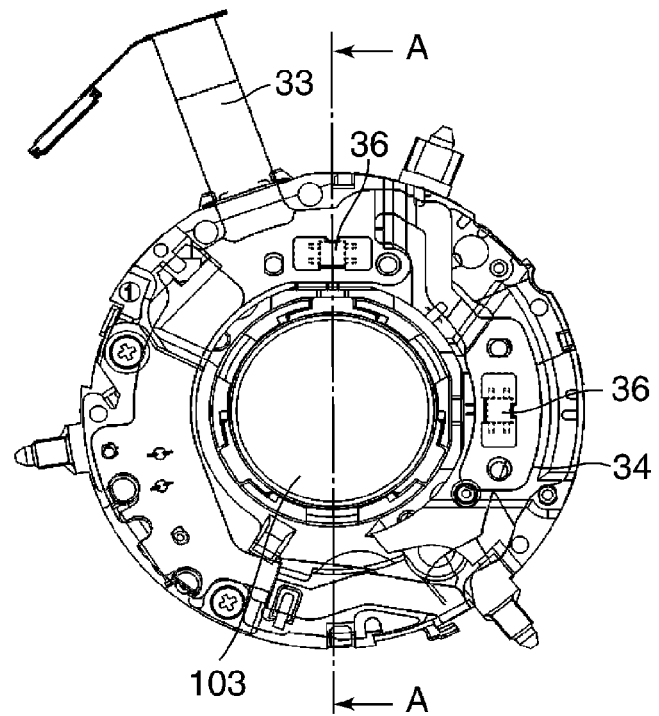
FIG. 6A is a front view showing a group-2 unit as seen from a subject side.
Figure 6B:
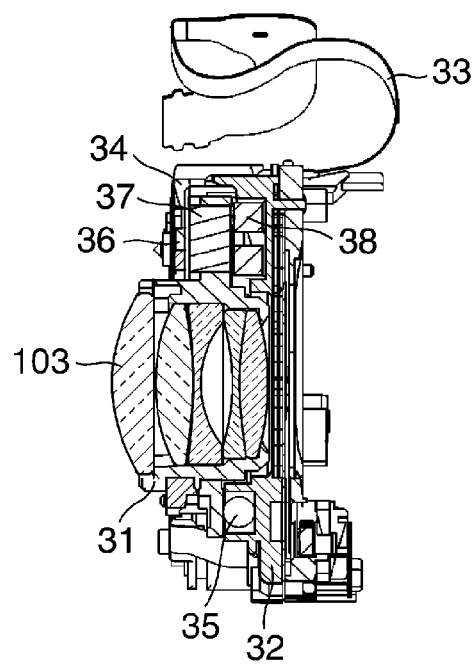
FIG. 6B is a cross-sectional view taken along line A-A in FIG. 6A.

Referring next to FIGS. 6A and 6B, a description will be given of an image stabilization apparatus. FIG. 6A is a front view showing the group-2 unit 2 as seen from a subject side, and FIG. 6B is a cross-sectional view taken along line A-A in FIG. 6A.

As shown in FIGS. 6A and 6B, the correction lens drive unit 116 (see FIG. 1) comprised of a magnet 37 and a coil 38 is provided on an outer peripheral side of the group-2 ground plate 32, and the correction lens drive unit 116 moves the group-2 lens holding frame 31, which holds the correction lens 103, in a direction perpendicular to the direction of the optical axis. Although not shown in FIGS. 6A and 6B, the diaphragm-shutter drive unit 114 in FIG. 1 is provided on an outer peripheral side of the correction lens 103 in the group-2 ground plate 32, and an ND drive unit, not shown, which drives an ND filter is provided on an image plane side of the group-2 ground plate 32.

The group-2 lens holding frame 31 and the group-2 ground plate 32 are connected together in the direction of the optical axis by two tension springs (not shown). Urging force of the two tension springs aligns the group-2 lens holding frame 31 to one side toward the group-2 ground plate 32 with a ball 35 being sandwiched between them in the direction of the optical axis. Rolling of the ball 35 causes the group-2 lens holding frame 31, which holds the correction lens 103, to move in a direction perpendicular to the optical axis.

A Hall device holding unit 34 holding Hall devices 36, which detect a position of the correction lens 103, is provided on a subject side of the group-2 ground plate 32. A shutter FPC 33 is routed on the Hall device holding unit 34 in a state of being electrically connected to the correction lens drive unit 116, the diaphragm-shutter drive unit 114, and the ND drive unit, and drawn out to an image plane side along a drawing surface of an outer peripheral portion of the Hall device holding unit 34.

The Hall devices 36 are mounted on the shutter FPC 33 at two locations 90 degrees apart from each other in a circumferential direction and connected to a barrel FPC, not shown, via the shutter FPC 33. The shutter FPC 33 is fixed to the Hall device holding unit 34, which is stopped in a state of being engaged with the group-2 ground plate 32 by snap fitting with the correction lens 103 being sandwiched therebetween.

The group-2 lens holding frame 31 is provided with the magnets 37 magnetized with a north pole and a south pole thereof sandwiching the Hall devices 36 therebetween, and a magnetic field passing through the magnet 37 is detected as an output from the two Hall devices 36 by the position detecting unit 117. When the group-2 lens holding frame 31 moves within a plane perpendicular to the optical axis, the magnetic field passing through the Hall devices 36 changes, causing the outputs from the Hall devices 36 to change as well, and therefore, a position of the group-2 lens holding frame 31 is detected by the position detecting unit 117.

The coil 38 is disposed at a location on an image plane side in the direction of the optical axis and opposed to the magnet 37 and is attached to the group-2 ground plate 32. The coil 38 is connected to the barrel FPC, not shown, via the shutter FPC 33, so that power is supplied from a power source of the camera. By passing electric current through the coil 38, magnetic force is generated to drive the group-2 lens holding frame 31.

Figure 7A:
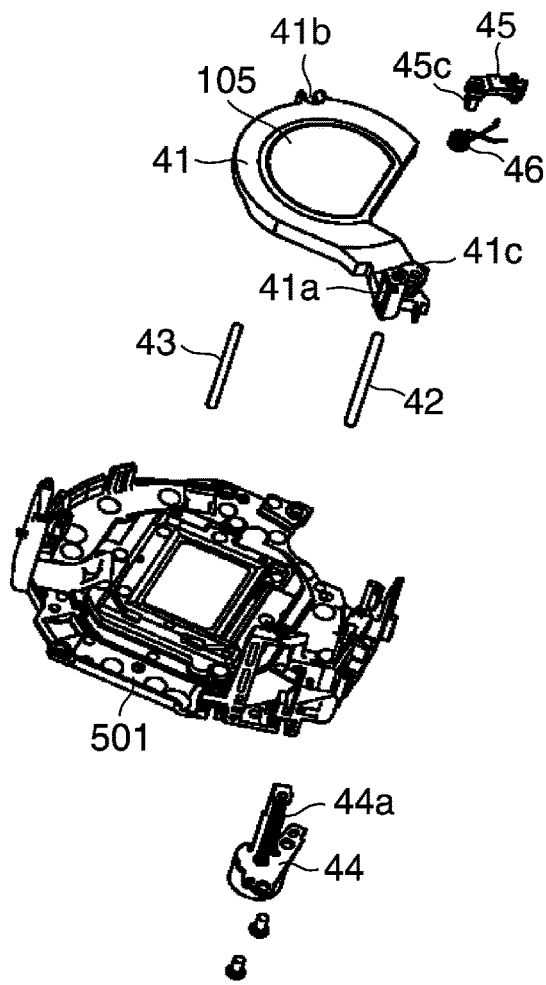
FIG. 7A is an exploded perspective view showing a focus lens drive unit.
Figure 7B:
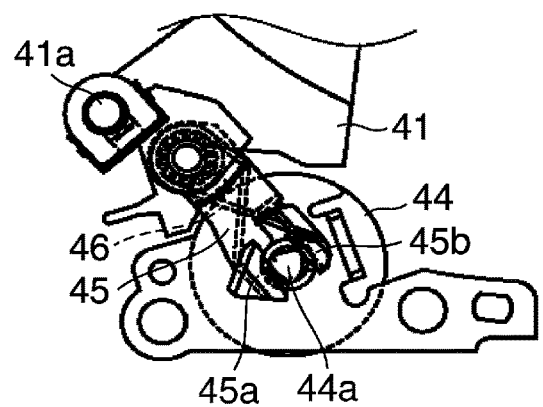
FIG. 7B is a view showing the focus lens drive unit as seen from a direction of an optical axis.

Referring next to FIGS. 4 and 7B, a description will be given of the focus lens drive unit 115. FIG. 7A is an exploded perspective view showing the focus lens drive unit 115, and FIG. 7B is a view showing the focus lens drive unit 115 as seen from the direction of the optical axis.

As shown in FIGS. 4 and 7B, a main guide shaft 42 parallel to the optical axis is forcibly pressed into and fixed in a hole of the sensor holder 501, and as with the main guide shaft 42, a sub guide shaft 43 for restricting rotation is forcibly pressed into and fixed in a hole of the sensor holder 501.

A sleeve 41b, which is to be engaged with the main guide shaft 42, and a U-shaped groove 41b, which is to be engaged with the sub guide shaft 43, are formed in the group-3 lens holding frame 41. Thus, the group-3 lens holding frame 41 is supported so as to be able to move straight in the direction of the optical axis relatively to the sensor holder 501.

In the group-3 lens holding frame 41, a supporting hole 41c for supporting a rack 45 is provided in proximity to the sleeve 41a, and a focus drive motor 44 is fastened and fixed to the sensor holder 501 via a screw or the like.

The rack 45 has a tooth portion 45a, which is threadedly engaged with a threaded shaft 44a, which is formed integrally with an output shaft of the focus drive motor 44, and an urged tooth portion 45b which is opposed to the tooth portion 45a in a radial direction of the threaded shaft 44a. A supporting shaft 45c, which is to be engaged with the supporting hole 41c of the group-3 lens holding frame 41, is formed in the rack 45.

The urged tooth portion 45b is urged by an arm portion of a torsion coil spring 46 in such a direction as to be threadedly engaged with the threaded shaft 44a, and the arm portion of the torsion coil spring 46 is hooked on a rear surface of the rack 45. As a result, the threaded shaft 44a is sandwiched between the urged tooth portion 45b and the tooth portion 45a in the radial direction, and the urged tooth portion 45b and the tooth portion 45a are threadedly engaged with the threaded shaft 44a all the time.

When the threaded shaft 44a is rotated by driving the focus drive motor 44, a threadedly engaging action of the rack 45 and the threaded shaft 44a causes the group-3 lens holding frame 41 to move straight in the direction of the optical axis. At this time, the torsion coil sprint 46 urges the rack 45 to a direction toward an end surface of the group-3 lens holding frame 41 in the direction of the optical axis. This prevents rattling of the rack 45 and the group-3 lens holding frame 41 and stably and accurately drives the group-3 lens holding frame 41 in the direction of the optical axis.

Here, when the correction lens 103 does not lie at a center of the optical axis, a shape of a mountain obtainment scanning waveform varies in the contrast AF method, and a position of the focus lens 105 differs from that of the focus lens 105 which attains focus when the correction lens 103 lies at the center of the optical axis.

Referring next to FIGS. 8A to 10B, a description will be given of how a position of the focus lens 105 is corrected when mountain obtainment scanning is performed.

Figure 8A:
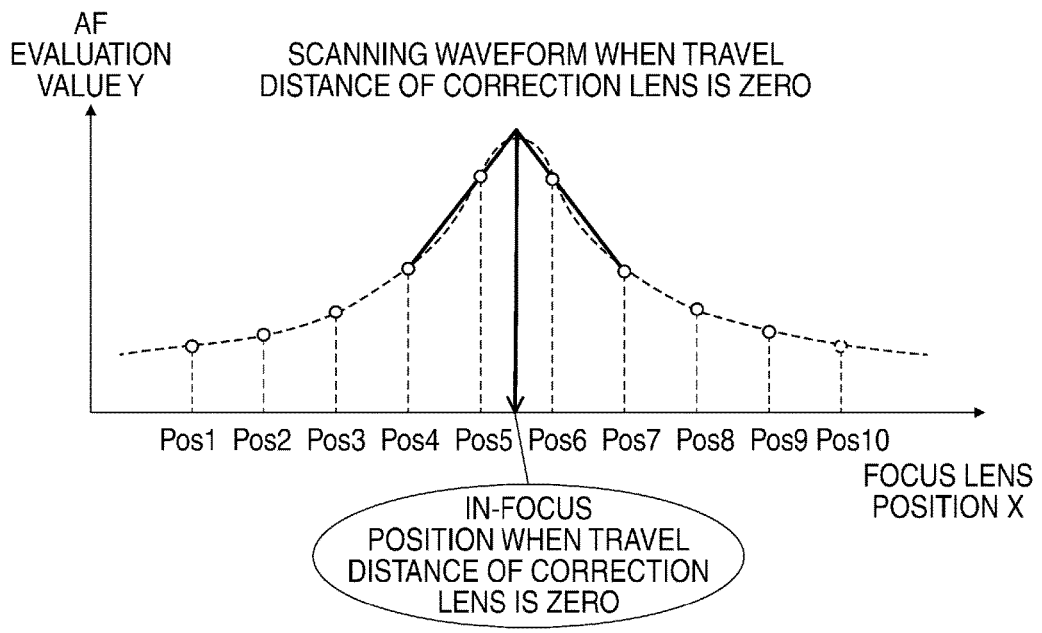
FIG. 8A is a graph showing a waveform of mountain obtainment scanning for a focus lens when an image stabilization lens lies at a center of the optical axis.

FIG. 8A is a graph showing a waveform of the mountain obtainment scanning for the focus lens 105 when the travel distance of the correction lens 103 is zero, that is, the correction lens 103 lies at the center of the optical axis. In FIG. 8A, the X-axis (horizontal axis) indicates positions of the focus lens 105, and the Y-axis (vertical axis) indicates AF evaluation values.

In FIG. 8A, there is a mountain top, that is, a peak of AF evaluation values between positions Pos 5 and Pos 6 of the focus lens 105. The peak may be calculated by making an approximation to a high-order curve, but here, for the sake of clarity, an intersection point of straight lines each connecting two points together, which is a point of switching between monotonous increase and monotonous decrease.

The point of switching between monotonous increase and monotonous decrease lies between Pos 5 and Pos 6. For this reason, an X-axis position of an intersection point of a straight line that connects Pos 4 and Pos 5 together and a straight line that connects Pos 6 and Pos 7 together is a position of the focus lens 105 at which contrast is the highest, that is, a position of the focus lens 105 which achieves focus.

Figure 8B:
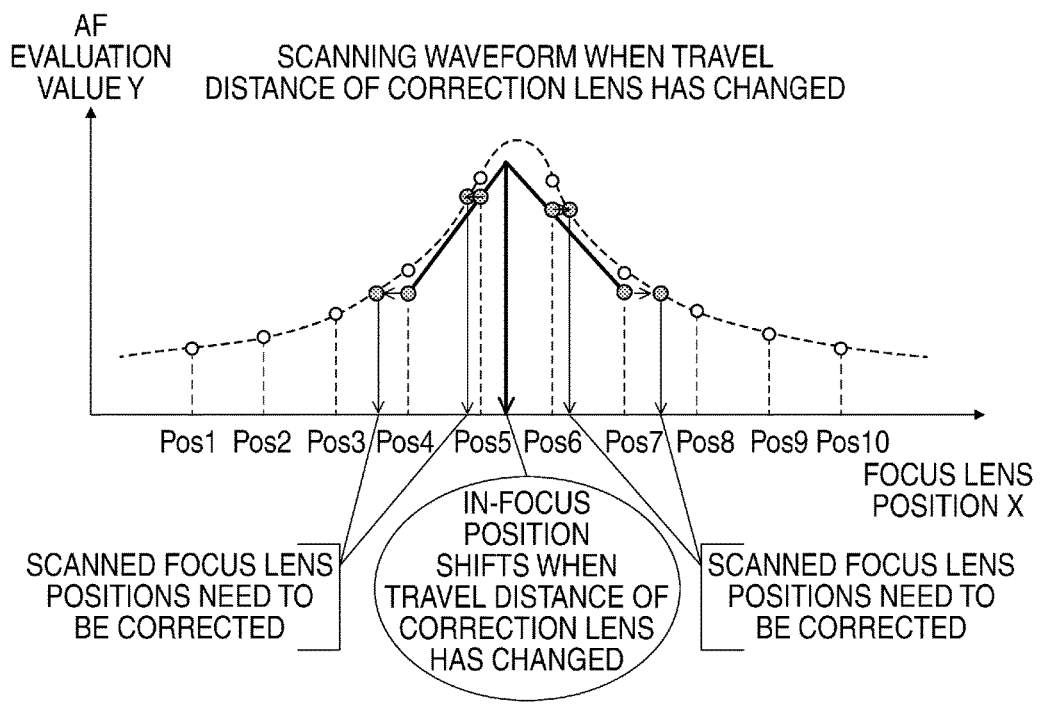
FIG. 8B is a graph showing a waveform of the mountain obtainment scanning for the focus lens when the travel distance of the image stabilization lens has changed.

FIG. 8B is a graph showing a waveform of the mountain obtainment scanning for the focus lens 105 when the travel distance of the correction lens 103 has changed. As with FIG. 8A, the X-axis (horizontal axis) indicates positions of the focus lens 105, and the Y-axis (vertical axis) indicates AF evaluation values.

It is assumed here that while the mountain obtainment scanning is being performed, the camera is wobbled, and the correction lens 103 is momentarily moved in a direction perpendicular to the optical axis to correct for image blurring. It is also assumed that, for example, when scanning is performed between Pos 4 to Pos 7, the travel distance of the correction lens 103 is not zero.

In this case, as shown in FIG. 8B, AF evaluation values, which would lie on a broken-line mountain waveform when the travel distance of the correction lens 103 is zero, alienate from the broken line according to the travel distance of the correction lens 103 which is momentarily moving. The degree of this alienation is uniquely determined by characteristics of the optical system.

Since the AF evaluation values are alienated from the mountain on which the AF evaluation values would lie when the travel distance of the correction lens 103 is zero, an X-axis position of an intersection point of the straight line that connects Pos 4 and Pos 5 together and a straight line that connects Pos 6 and Pos 7 together may deviate from an X-axis position of the intersection point when the travel distance of the correction lens 103 is zero.

Figure 9A:
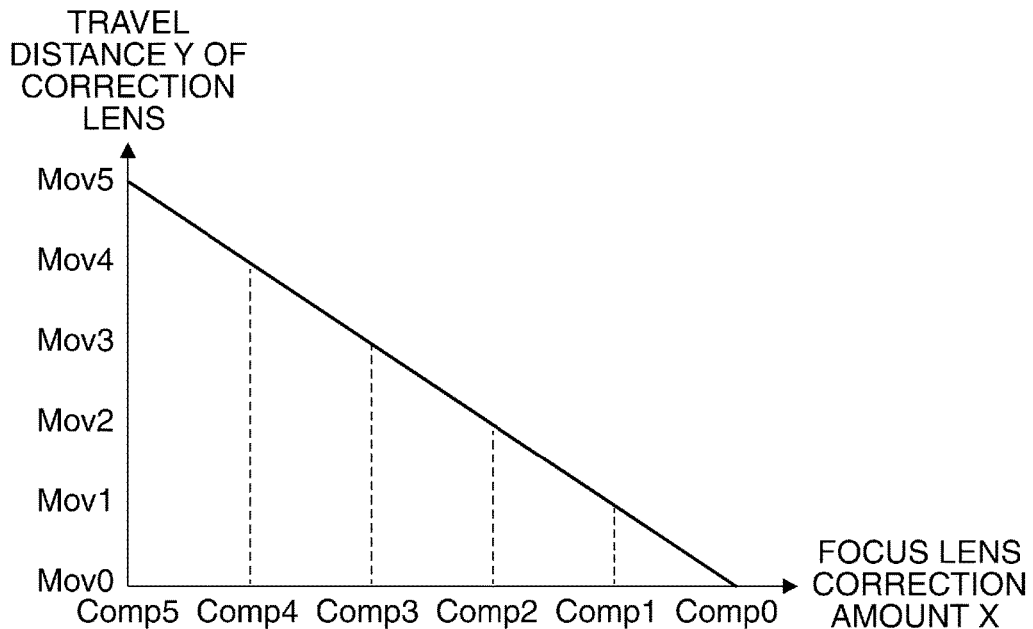
FIG. 9A is a graph showing a relationship between travel distances of the image stabilization lens and amounts by which a position of the focus lens is corrected.

Here, FIG. 9A is a graph showing a relationship between travel distances of the correction lens 103 and amounts by which the focus lens position is corrected. In FIG. 9A, the X-axis indicates amounts by which the position of the focus lens is corrected, and the Y-axis indicates travel distances of the correction lens 103.

In FIG. 9A, when the travel distance of the correction lens 103 is zero, that is, the correction lens 103 lies at the center of the optical axis, the travel distance of the correction lens 103 is represented by Mov 0. When the travel distance of the correction lens 103 is Mov 0, the amount by which the focus lens position is corrected is Comp 0. Concrete values of Mov 0 and Comp 0 are zero.

On the other hand, when the travel distance of the correction lens 103 is the greatest, that is, the correction lens 103 is positioned farthest from the center of the optical axis, the travel distance of the correction lens 103 is represented by Mov 5 in FIG. 9A. The amount by which the focus lens position is corrected is Comp 5 when the travel distance of the correction lens 103 is Mov 5. Numeric values including Mov 5 and Comp 5 vary with characteristics of the optical system. Although in FIG. 9A, the relationship between travel distances of the correction lens 103 and amounts by which the focus lens position is corrected is represented by a straight line, it may be a curve depending on characteristics of the optical system.

When correction of the focus lens position is applied to FIG. 8B, the focus lens position is Pos 4—Comp 5, not Pos 4, when the travel distance of the correction lens 103 is Mov 5 in a case where scanning is performed at Pos 4. In this case, a relationship among focus lens positions, travel distances of the correction lens, and corrected focus lens positions is as below.

Focus lens position Travel distance of correction lens Corrected focus lens position Pos 4 Mov 5 Pos 4−Comp 5=Pos 4'

Pos 5 Mov 1 Pos 5−Comp 1=Pos 5'

Pos 6 Mov 2 Pos 6−Comp 2=Pos 6'

Pos 7 Mov 4 Pos 7−Comp 4=Pos 7'

Specifically, by calculating the above described intersection point using Pos 4' to Pos 7' instead of Pos 4 to Pos 7, a peak position with a reduced error is calculated.

Figure 9B:
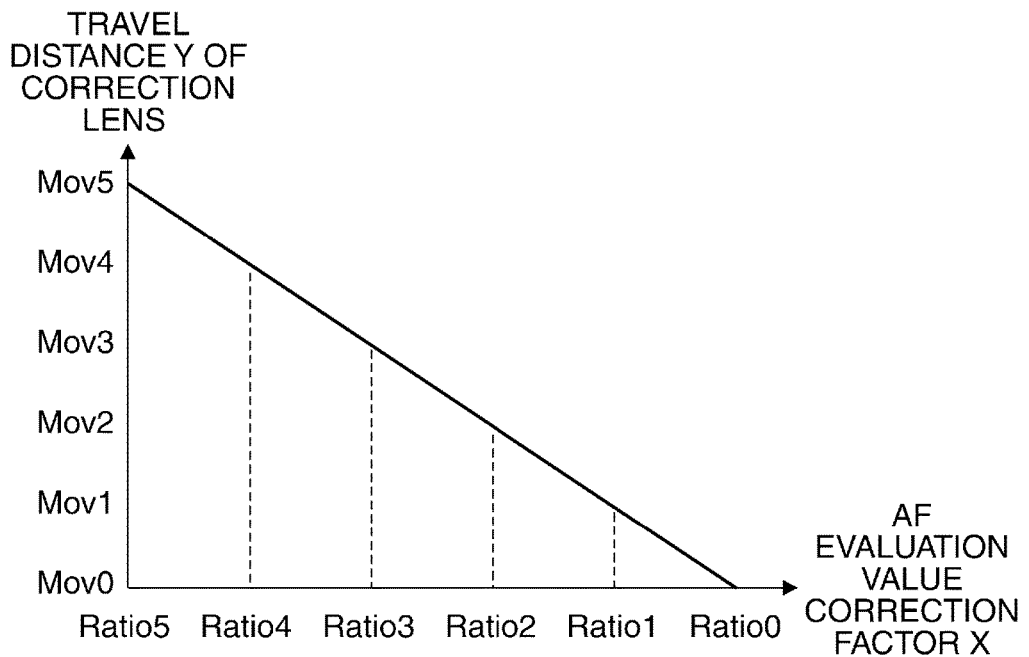
FIG. 9B is a graph showing a relationship between travel distances of the image stabilization lens and AF evaluation value correction factors.
Figure 10A:
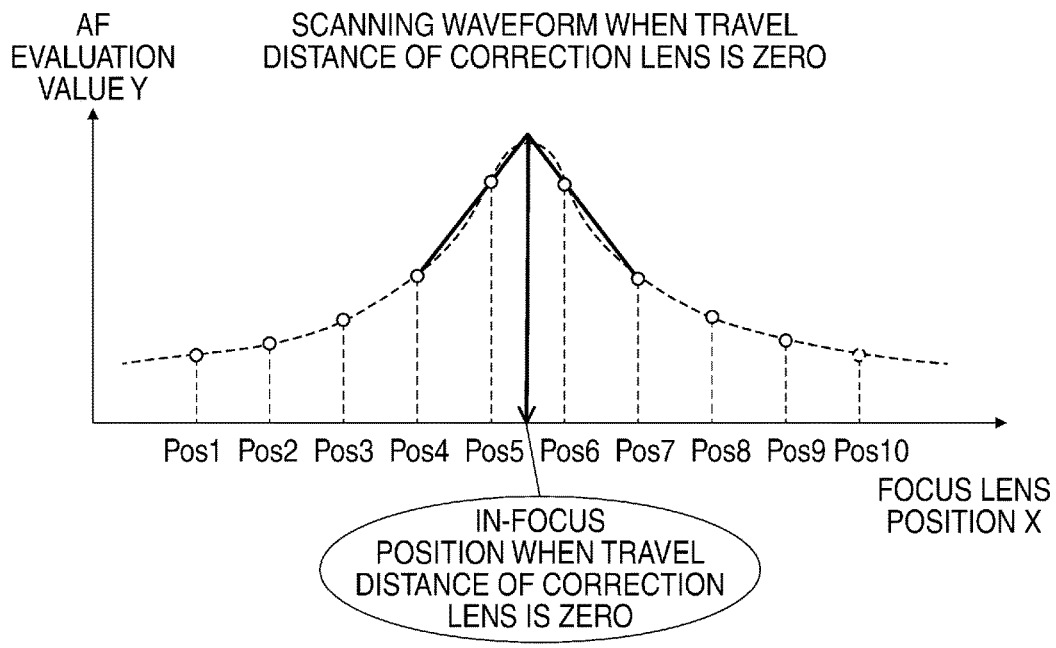
FIG. 10A is a graph showing a waveform of the mountain obtainment scanning for the focus lens when the image stabilization lens lies at the center of the optical axis.
Figure 10B:
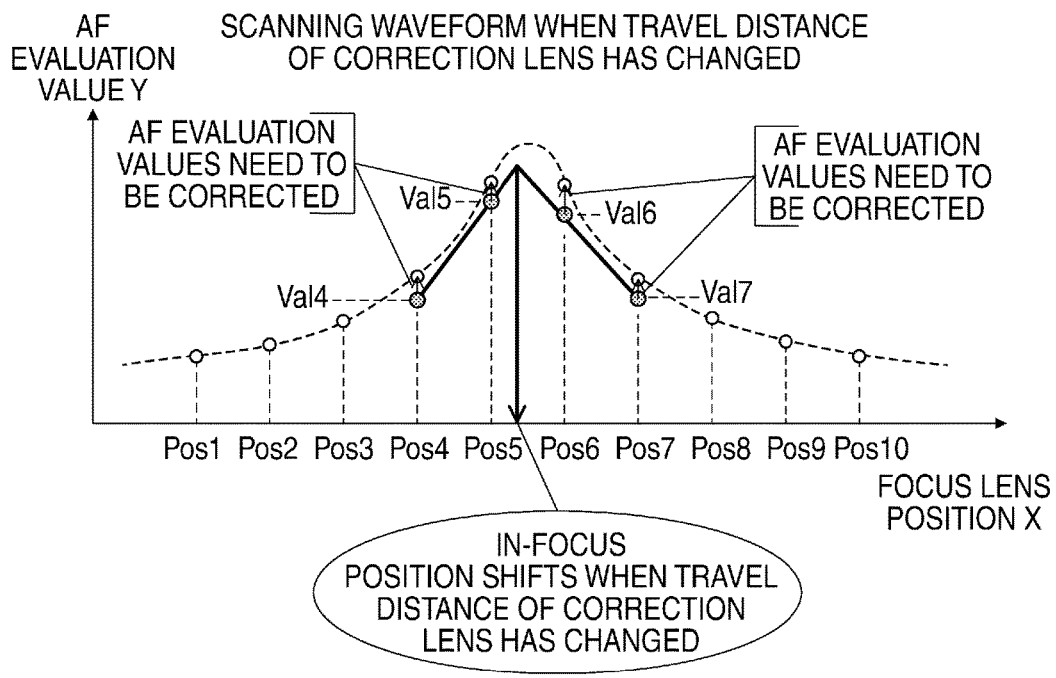
FIG. 10B is a graph showing a waveform of the mountain obtainment scanning for the focus lens when the travel distance of the image stabilization lens has changed.

Referring to FIGS. 9B and 10B, a description will be given of a method for correcting an AF evaluation value, aside from a method for correcting a focus lens position subjected to the mountain obtainment scanning. FIG. 9B is a graph showing a relationship between travel distances of the correction lens 103 and AF evaluation value correction factors, and the X-axis indicates correction factors for AF evaluation value correction factors, and the Y-axis indicates travel distances of the correction lens 103.

FIG. 10A is a graph showing a waveform of the mountain obtainment scanning for the focus lens 105 when the travel distance of the correction lens 103 is zero, that is, the correction lens 103 lies at the center of the optical axis. FIG. 10B is a graph showing a waveform of the mountain obtainment scanning for the focus lens 105 when the travel distance of the correction lens 103 has changed. In both of FIGS. 10A and 10B, the X-axis indicates positions of the focus lens 105, and the Y-axis indicates AF evaluation values.

In FIG. 9B, when the travel distance of the correction lens 103 is zero, that is, the correction lens 103 lies at the center of the optical axis, the travel distance of the correction lens 103 is represented by Mov 0. When the travel distance of the correction lens 103 is Mov 0, an AF evaluation value correction factor is Ratio 0. As concrete numeric values, Mov 0 is zero and Ratio 0 is 0%.

On the other hand, when the travel distance of the correction lens 103 is the greatest, that is, the correction lens 103 is positioned farthest from the center of the optical axis, the travel distance of the correction lens 103 is represented by Mov 5 in FIG. 9B. An AF evaluation value correction factor is Ratio 5 when the travel distance of the correction lens 103 is Mov 5. Numeric values including Mov 5 and Ratio 5 vary with characteristics of the optical system. Although in FIG. 9B, the relationship between travel distances of the correction lens 103 and AF evaluation value correction factors is represented by a straight line, it may be a curve depending on characteristics of the optical system.

When correction of AF evaluation values is applied to FIG. 10B, the AF evaluation value is assumed to be Val 4×(Ratio 5/100), not Val 4, when the travel distance of the correction lens 103 is Mov 5 in a case where scanning is performed at Pos 4. In this case, a relationship among AF evaluation values, travel distances of the correction lens 103, and corrected AF evaluation values are as below.

AF evaluation value Travel distance of correction lens Corrected AF evaluation value Val 4 Mov 5 Val 4×(Ratio 5/100)=Val 4'

Val 5 Mov 1 Val 5×(Ratio 1/100)=Val 5'

Val 6 Mov 2 Val 6×(Ratio 2/100)=Val 6'

Val 7 Mov 4 Val 7×(Ratio 4/100)=Val 7'

Specifically, by calculating the above described intersection point using Val 4' to Val 7' instead of Val 4 to Val 7, a peak position with a reduced error is calculated.

Figure 11:
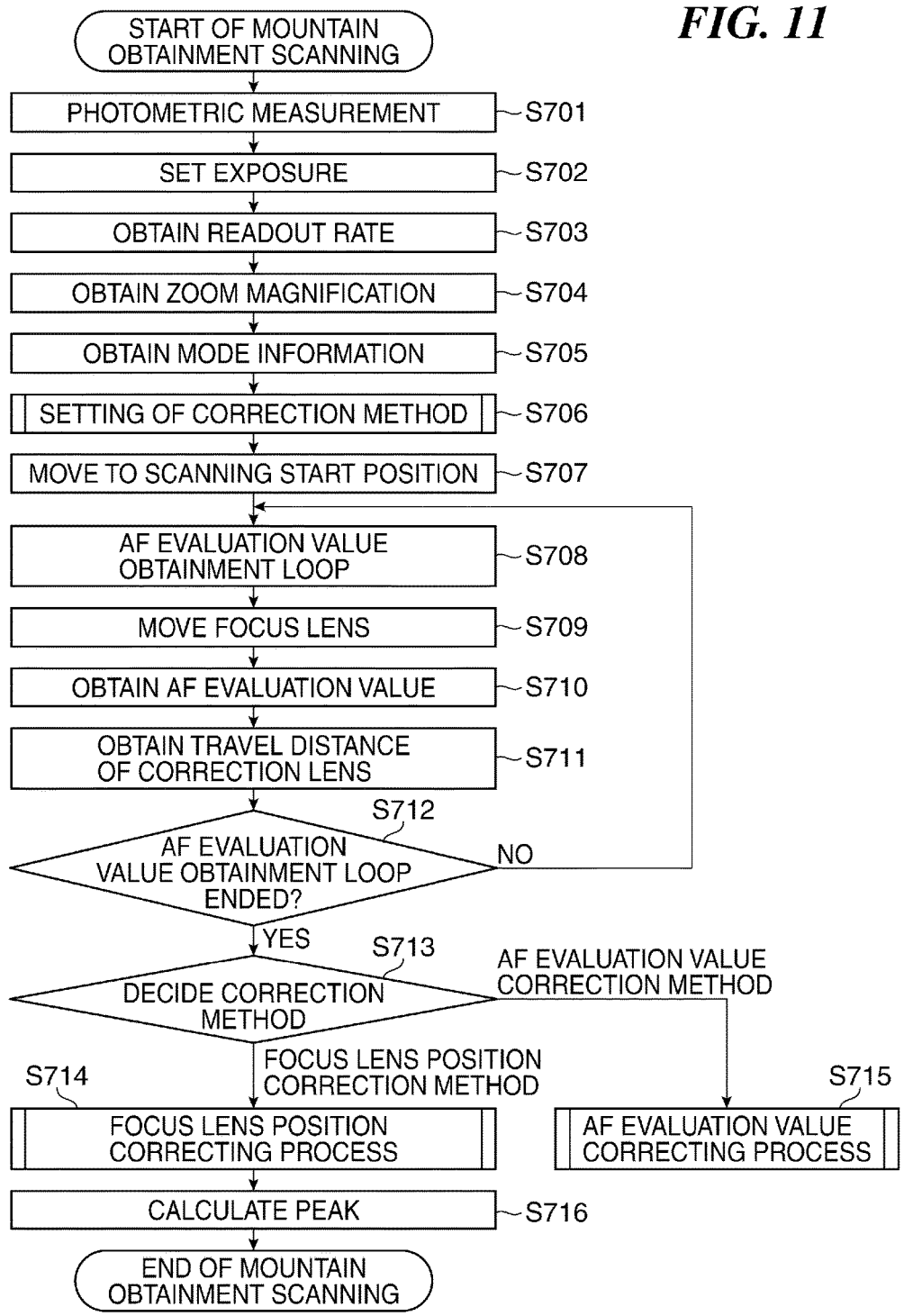
FIG. 11 is a flowchart useful in explaining how a position of the focus lens is corrected when the mountain obtainment scanning is performed.

Referring next to FIG. 11 to 13B, a description will be given of how the camera operates during the mountain obtainment scanning. FIG. 11 is a flowchart useful in explaining how the position of the focus lens 105 is corrected during the mountain obtainment scanning. Processes in FIG. 11 are carried out by a CPU or the like of the system control unit 119 executing programs stored in a storage unit such as the internal memory 108 and expanded into the storage memory 111.

As shown in FIG. 11, when the mountain obtainment scanning is started, the system control unit 119 carries out a photometric measurement process in step S701, and then, in step S702, sets an exposure using a result of the photometric measurement in the step S701, followed by the process proceeding to step S703. Then, in the step S703, the system control unit 119 obtains a readout rate (frame rate) of the image pickup device 106, and in steps S704 and S705, obtains a zoom magnification and shooting mode information, respectively, followed by the process proceeding to step S706.

In the step S706, the system control unit 119 sets a correction method using the readout rate of the image pickup device 106 obtained in the step S703, and the zoom magnification and the shooting mode information obtained in the steps S704 and S705, respectively, followed by the process proceeding to step S707. It should be noted that here, a focus lens position correction method or an AF evaluation value correction method is set as the correction method, but a correction method setting process will be described later in detail with reference to FIGS. 12A to 12C.

In the step S707, the system control unit 119 moves the focus lens 105 to a starting position of the mountain obtainment scanning. Then, in step S708, the system control unit 119 starts an AF evaluation obtainment loop, and in step S709, moves the focus lens 105 at predetermined intervals within a scanning range. In steps S710 and S711, the system control unit 119 obtains AF evaluation values and travel distances of the correction lens at respective positions of the focus lens 105 moved at the predetermined intervals in the step S709, followed by the process proceeding to step S712.

In the step S712, the system control unit 119 judges whether or not the AF evaluation obtainment loop has been ended. When it has been ended, the process proceeds to step S713, and when it has not been ended, the process returns to the step S708, in which the system control unit 119 continues the AF evaluation obtainment loop.

In the step S713, the system control unit 119 judges whether the correction method set in the step S706 is the focus lens position correction method or the AF evaluation value correction method. When the correction method is the focus lens position correction method, the process proceeds to step S714, and when the correction method is the AF evaluation value correction method, the process proceeds to step S715.

Then, in the step S714, the system control unit 119 corrects the positions of the focus lens 105 obtained when the mountain obtainment scanning was performed, followed by the process proceeding to step S716, or in the step S715, the system control unit 119 corrects the AF evaluation values obtained when the mountain obtainment scanning was performed, followed by the process proceeding to the step S716. The focus lens position correcting process in the step S714 and the AF evaluation value correcting process in the step S715 will be described later with reference to FIGS. 13A and 13B. In the step S716, the system control unit 119 calculates a peak position using the focus lens positions or the AF evaluation values corrected in the step S714 or the step S715 and ends the mountain obtainment scanning.

Figure 12A:
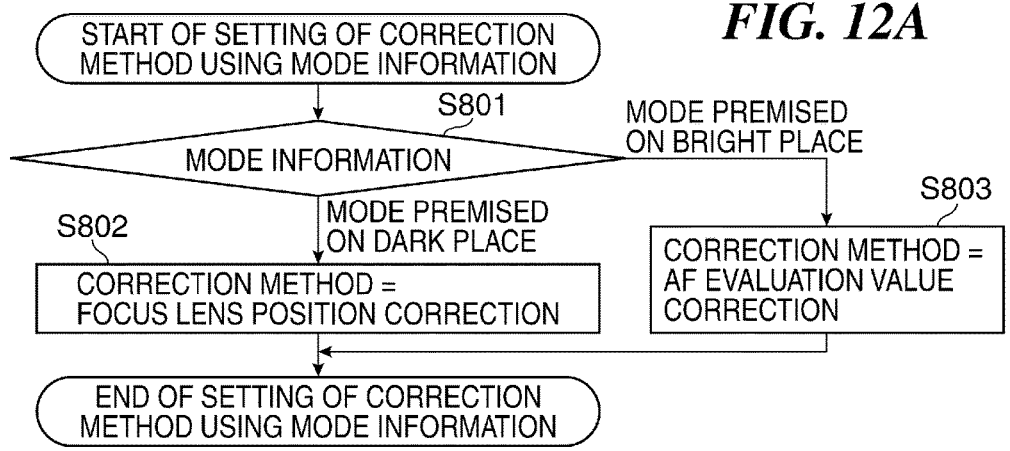
FIGS. 12A to 12C are flowcharts useful in explaining a correction method setting process in step S706 in FIG. 11.
Figure 12B:
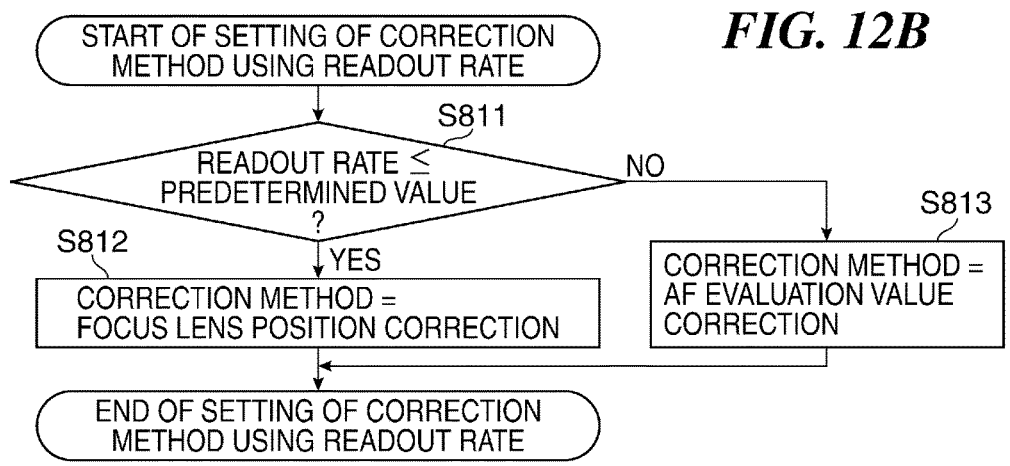
Figure 12C:
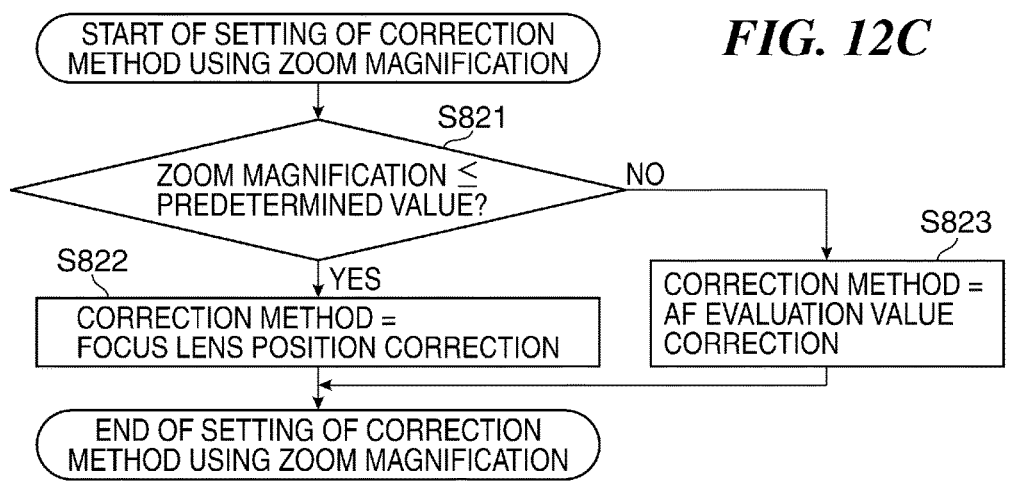

Referring next to FIGS. 12A to 12C, a description will be given of the correction method setting process in the step S706 in FIG. 11.

FIG. 12A is a flowchart useful in explaining the correction method setting process using mode information.

Referring to FIG. 12A, in step S801, the system control unit 119 judges whether the mode information obtained in the step S705 in FIG. 11 indicates a mode premised on a bright place or a mode premised on a dark place. When the mode information obtained in the step S705 indicates the mode premised on a dark place, the process proceeds to step S802, and when the mode information obtained in the step S705 indicates the mode premised on a bright place, the process proceeds to step S803.

Then, in the step S802, the system control unit 119 selects and sets the focus lens position correction method as the correction method, or in the step S803, selects and sets the AF evaluation value correction method as the correction method. The system control unit 119 then ends the process.

In general, a signal-to-noise ratio of an output from the image pickup device 106 deteriorates in the mode premised on a dark place, for example, a night scene mode, and hence there is much noise. When there is much noise in an output from the image pickup device 106, there is much noise on AF evaluation values as well, and hence a mountain shape tends to be unclear.

For this reason, in the mode premised on a dark place, a peak position (in-focus position) after correction is made more reliable by correcting focus lens positions than by correcting AF evaluation values themselves. On the other hand, in the mode premised on a bright place, for example, a landscape mode, a mountain shape tends to be clear, and therefore, a peak position after correction is made more reliable by correcting AF evaluation values themselves than by correcting focus lens positions.

FIG. 12B is a flowchart useful in explaining the correction method setting process using a readout rate.

Referring to FIG. 12B, in step S811, the system control unit 119 judges whether or not the readout rate of the image pickup device 106 obtained in the step S703 in FIG. 11 is equal to or smaller than a value determined in advance. When the obtained readout rate is a low rate equal to or smaller than the value determined in advance, the process proceeds to step S812, and when the obtained readout rate is a high rate greater than the value determined in advance, the process proceeds to step S813.

Then, in the step S812, the system control unit 119 selects and sets the focus lens position correction method as the correction method, or in the step S813, selects and sets the AF evaluation value correction method as the correction method. The system control unit 119 then ends the process.

In general, in a bright place, a clear mountain shape of AF evaluation values is obtained within a short exposure time period in many cases, and hence the readout rate tends to be high, whereas in a dark place, the readout rate tends to be low. As described earlier, in a dark place where the readout rate is low, there tends to be much noise on AF evaluation values, and hence a peak position after correction is more reliable when focus lens positions are corrected. On the other hand, in a bright place where the readout rate is high, a mountain shape of AF evaluation values is clear, and therefore, a peak position after correction is more reliable when AF evaluation values are corrected.

FIG. 12C is a flowchart useful in explaining the correction method setting process using a zooming information.

Referring to FIG. 12C, in step S821, the system control unit 119 judges whether or not the zoom magnification obtained in the step S704 in FIG. 11 is a wide-angle side zoom magnification equal to or smaller than a value determined in advance. When the obtained zoom magnification is a wide-angle side zoom magnification equal to or smaller than the value determined in advance, the process proceeds to step S822, and when the obtained zoom magnification is a telephoto side zoom magnification greater than the value determined in advance, the process proceeds to step S823.

Then, in the step S822, the system control unit 119 selects and sets the focus lens position correction method as the correction method, or in the step S823, selects and sets the AF evaluation value correction method as the correction method. The system control unit 119 then ends the process.

In general, when the zoom magnification is on a wide-angle side, the range of movement of the correction lens 103 is narrow, and when the zoom magnification is on a telephoto side, the range of movement of the correction lens 103 is wide. As the travel distance of the correction lens 103 increases, correcting a position of the focus lens 105 may cause reversal to an immediately preceding scanning position, depending on scanning intervals. In this case, reliability of a peak position calculated may be low.

Figure 13A:
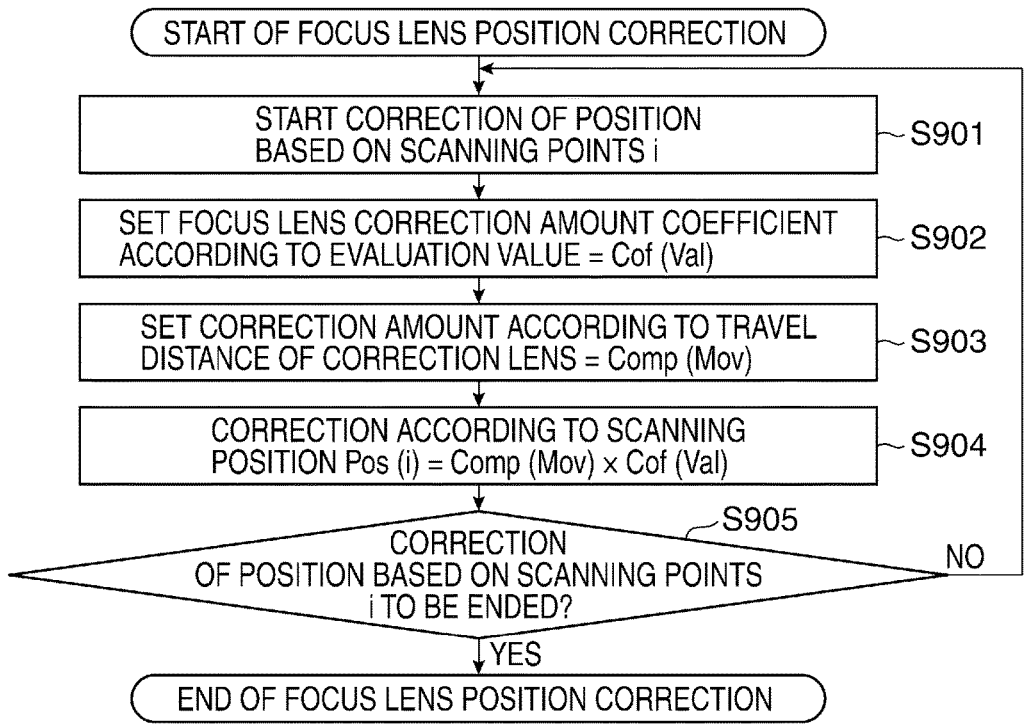
FIGS. 13A and 13B are flowcharts useful in explaining a focus lens position correcting process and an AF evaluation value correcting process.
Figure 13B:
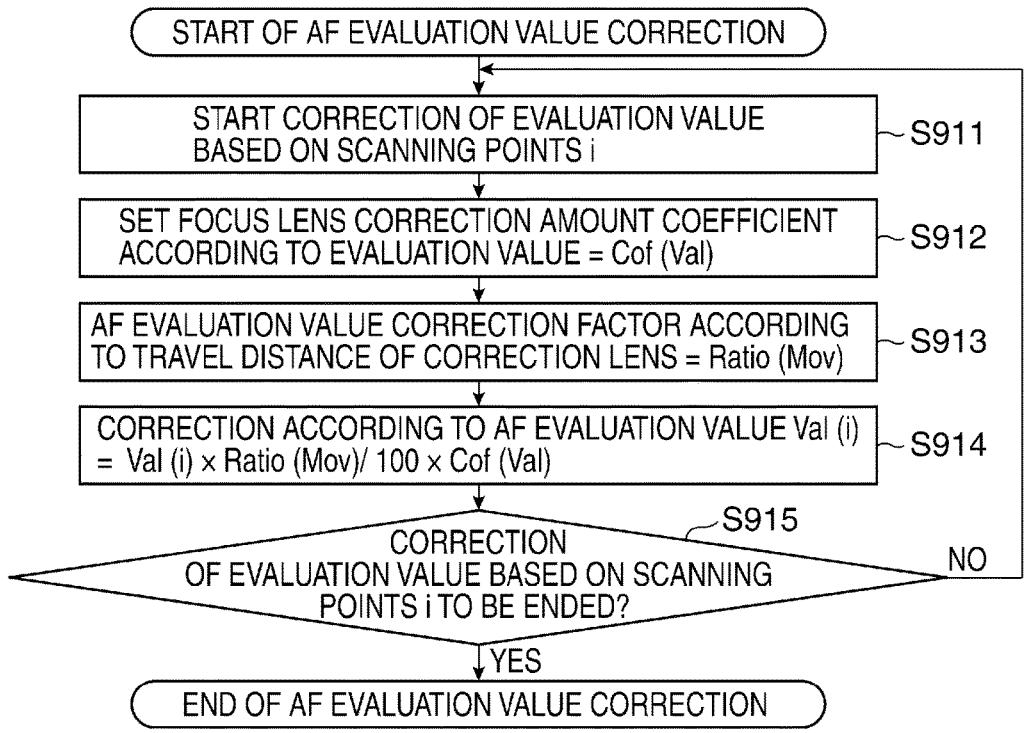

Referring next to FIGS. 13A and 13B, a description will be given of a focus lens position correcting process and an AF evaluation value correcting process. FIG. 13A is a flowchart useful in explaining the focus lens position correcting process, and FIG. 13B is a flowchart useful in explaining the AF evaluation value correcting process.

First, a description will be given of the focus lens position correcting process with reference to FIG. 13A.

Referring to FIG. 13A, in step S901, the system control unit 119 starts the focus lens position correcting process for all mountain obtainment scanning points when it is assumed that the number of mountain obtainment scanning points is i, followed by the process proceeding to step S902.

In the step S902, the system control unit 119 sets a correction coefficient for a focus lens position according to a level of an AF evaluation value, followed by the process proceeding to step S903. Here, a focus lens position correction amount is uniquely determined by a position of the correction lens 103 in an optical manner based on its position when focus is achieved. For this reason, when a subject is out of focus, a focus lens position correction amount is multiplied by the correction coefficient, which is a weighting coefficient, to perform focus adjustment. It is assumed that the correction coefficient used at this time is Cof (Val) which is a value dependent on an AF evaluation value.

In the step S902, the system control unit 119 sets a focus lens position correction amount according to a travel distance of the correction lens 103, followed by the process proceeding to step S904. This correction amount is Comp (Mov) which is a value dependent on a travel distance of the correction lens 103 (see FIG. 9A).

In the step S904, the system control unit 119 corrects a focus lens position according to each scanning position Pos (i) of the focus lens 105 to find a corrected focus lens position Pos (i)'=Pos (i)−Comp (Mov)×Cof (Val), followed by the process proceeding to step S905.

In the step S905, the system control unit 119 judges whether or not correction of focus lens positions for all the points has been completed, and when not completed, the process returns to the step S901 to continue the process, and when completed, the system control unit 119 ends the focus lens position correcting process.

Referring next to FIG. 13B, a description will be given of the AF evaluation value correcting process.

Referring to FIG. 13B, in step S911, the system control unit 119 starts the AF evaluation correcting process for all mountain obtainment scanning points when it is assumed that the number of mountain obtainment scanning points is i, followed by the process proceeding to step S912.

In the step S912, the system control unit 119 sets a correction coefficient for a focus lens position according to a level of an AF evaluation value, followed by the process proceeding to step S913. It is assumed that the correction coefficient set here is Cof (Val), which is a value depending on an AF evaluation value, as with the focus lens correcting process.

In the step S913, the system control unit 119 sets an AF evaluation value correction factor according to a travel distance of the correction lens 103, followed by the process proceeding to step S914. This correction factor is Ratio (Mov) which is a value dependent on a travel distance of the correction lens 103 (see FIG. 9B).

In the step S914, the system control unit 119 corrects the AF evaluation value according to each AF evaluation value Val (i) of the focus lens 105 at each scanning point i to find a corrected AF evaluation value Val (i)'=Val (i)×(Ratio (Mov)/100)×Cof (Val), followed by the process proceeding to step S915.

In the step S915, the system control unit 119 judges whether or not correction of AF evaluation values for all the points has been completed. When correction of AF evaluation values for all the points has not been completed, the process returns to the step S911, in which the system control unit 119 continues the process, and when correction of AF evaluation values for all the points has been completed, the system control unit 119 ends the AF evaluation value correcting process.

According to the present embodiment described above, it is possible to reduce an error in a detected peak position of a mountain at which the contrast varying with travel distances of the correction lens 103 is the highest. As a result, high-quality images are shot because focus is achieved with high accuracy while image stabilization performance is improved by increasing the travel distance of the correction lens 103.

It should be noted that although in the embodiment described above, the digital camera is taken as an example of the image pickup apparatus, the present invention may be applied to such image pickup apparatuses as a digital single-lens reflex camera, a digital video camera, and a mobile terminal with an image pickup function.

Moreover, although in the embodiment described above, the correction lens 103 of the lens barrel 101 is taken as an example of the optical device which corrects for image blurring, image blurring may be corrected for in a single-lens reflex camera or the like by moving an image pickup device in a camera main body in a direction different from an optical axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-078972, filed Apr. 11, 2016 which is hereby incorporated by reference herein in its entirety.

What is claimed is:

1. An image pickup apparatus that corrects for image blurring of a subject image formed on an image pickup device by moving an optical device, which is configured to correct for image blurring, in a direction different from a direction of an optical axis, comprising:
   at least one processor that executes computer instructions or a circuit that operates as:
      a focusing control unit configured to provide focusing control by using AF evaluation values at respective positions of a focus lens, which moves in the direction of the optical axis, at predetermined intervals; and
      a correction unit configured to, during the focusing control, correct position information about positions of the focus lens obtained when the AF evaluation values were obtained according: to positions of the optical device in direction perpendicular to the optical axis, which were detected by a position detecting unit, such that a relationship between the obtained AF evaluation and the obtained position information varies.

2. The image pickup apparatus according to claim 1, further comprising an obtaining unit configured to obtain information on at least one of the following: a readout rate of the image pickup device, a zoom magnification, and a shooting mode,
   wherein based on the information obtained bye said obtaining unit, said correction unit selectively determines whether to correct the position information about positions of the focus lens when the AF evaluation values were obtained or correct the obtained AF evaluation values.

3. The image pickup apparatus according to claim 2, wherein
   said obtaining unit obtains mode information on the shooting mode, and
   when the mode information indicates a mode premised on a dark place, said correction unit selects a correction method that corrects the position information about positions of the focus lens obtained when the AF evaluation values were obtained, and when the node information indicates a mode premised on a bright place, said correction unit, selects a correction method that corrects the obtained AF evaluation values.

4. The image pickup apparatus according to claim 2, wherein
   said obtaining unit obtains information on the readout rate of the image pickup device, and
   when the information on the readout rate indicates a low readout rate not more than a value determined in advance, said correction unit selects a correction method that corrects the position information about positions of the focus lens obtained when the AF evaluation value were obtained, and when the information on the readout rate indicates a high readout rate more than the value determined in advance, said correction unit selects a correction method that corrects the obtained AF evaluation values.

5. The image pickup apparatus according to claim 2, wherein
   said obtaining unit obtains information on the zoom magnification, and
   when the information on the zoom magnification indicates a wide-angle side zoom magnification not more than a value determined in advance, said correction unit selects a correction method that corrects the position information about positions of the focus lens obtained when the AF evaluation values were obtained, and when the information on the zoom magnification indicates a telephoto side zoom magnification more than the value determined in advance, said correction unit selects a correction method that corrects the obtained AF evaluation values.

6. The image pickup apparatus according to claim 1, wherein said correction unit makes corrections by multiplying correction amounts for use in correcting the position information about positions of the focus lens obtained when the AF evaluation values were obtained by weighting coefficients varying with levels of the AF evaluation values.

7. The image pickup apparatus according to claim 1, wherein said focusing control unit provides the focusing control by calculating a shape of a contrast using the AF evaluation values and using a position of the focus lens at which the contrast is at its peak as a position at which a bundle of rays comes to a focus on a light-incident plane of the image pickup device.

8. A control method for an image pickup apparatus having at least one processor that executes computer instructions or a circuit that corrects for image blurring of a subject image formed on an image pickup device by moving an optical device, which is configured to correct for image blurring, in a direction different from a direction of an optical axis, comprising:
   a focusing control step of providing focusing control by using AF evaluation values at respective positions of a focus lens, which moves in the direction of the optical axis, at predetermined intervals, said focusing control step being performed by the processor or the circuit;
   a position detecting step of detecting positions of the optical device in a direction perpendicular to the optical axis, said position detecting stop being performed by the processor or the circuit; and
   a correction step of, during the focusing control, correcting position information about positions of the focus lens obtained when the AF evaluation values were obtained according to the positions of the optical device in the direction perpendicular to the optical axis, which were detected in said position detecting step, said correction step being, performed by the processor or the circuit, such that a relationship between the obtained AF evaluation and the obtained position information varies.

* * * * *